(12) United States Patent
Jacob

(10) Patent No.: US 10,121,241 B1
(45) Date of Patent: Nov. 6, 2018

(54) SYSTEM AND METHOD FOR ASSESSING A BUILDING STRUCTURE

(71) Applicant: STATE FARM MUTUAL AUTOMOBILE INSURANCE COMPANY, Bloomington, IL (US)

(72) Inventor: Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 15 days.

(21) Appl. No.: 15/295,530

(22) Filed: Oct. 17, 2016

Related U.S. Application Data

(60) Provisional application No. 62/244,968, filed on Oct. 22, 2015.

(51) Int. Cl.
| | |
|---|---|
| *G06T 7/00* | (2017.01) |
| *G06K 9/62* | (2006.01) |
| *G06T 11/60* | (2006.01) |
| *G06K 9/78* | (2006.01) |
| *G06T 7/40* | (2017.01) |

(52) U.S. Cl.
CPC ............ *G06T 7/001* (2013.01); *G06K 9/6202* (2013.01); *G06K 9/6267* (2013.01); *G06K 9/78* (2013.01); *G06T 7/408* (2013.01); *G06T 11/60* (2013.01); *G06T 2207/10024* (2013.01); *G06T 2207/10032* (2013.01)

(58) Field of Classification Search
CPC ................. G06T 7/001; G06T 11/60; G06T 2207/10024; G06T 2207/10032; G06K 9/78; G06K 9/6267; G06K 9/6202
See application file for complete search history.

(56) References Cited

U.S. PATENT DOCUMENTS

| | | | |
|---|---|---|---|
| 2013/0216089 A1* | 8/2013 | Chen ..................... | G06T 7/0002 382/100 |
| 2014/0270492 A1* | 9/2014 | Christopulos ...... | G06K 9/00637 382/159 |

* cited by examiner

*Primary Examiner* — Siamak Harandi
(74) *Attorney, Agent, or Firm* — Marshall, Gerstein & Borun LLP; Randall G. Rueth

(57) ABSTRACT

A computer-implemented method for assessing a building structure. The method includes receiving information indicative of captured data, the captured data comprising an image of the building structure. The method includes receiving information indicative of an analysis of the captured data. The method includes based on the analysis of the captured data, performing an assessment of the one or more examined regions. Performing the assessment includes determining one or more classifications each corresponding to a different one of the one or more examined regions, and determining one or more indicators each corresponding to a different one of the one or more classifications. The method includes determining a mapping of the one or more indicators to the one or more examined regions. The method includes providing for display the one or more indicators overlaid onto the image according to the determined mapping.

20 Claims, 7 Drawing Sheets

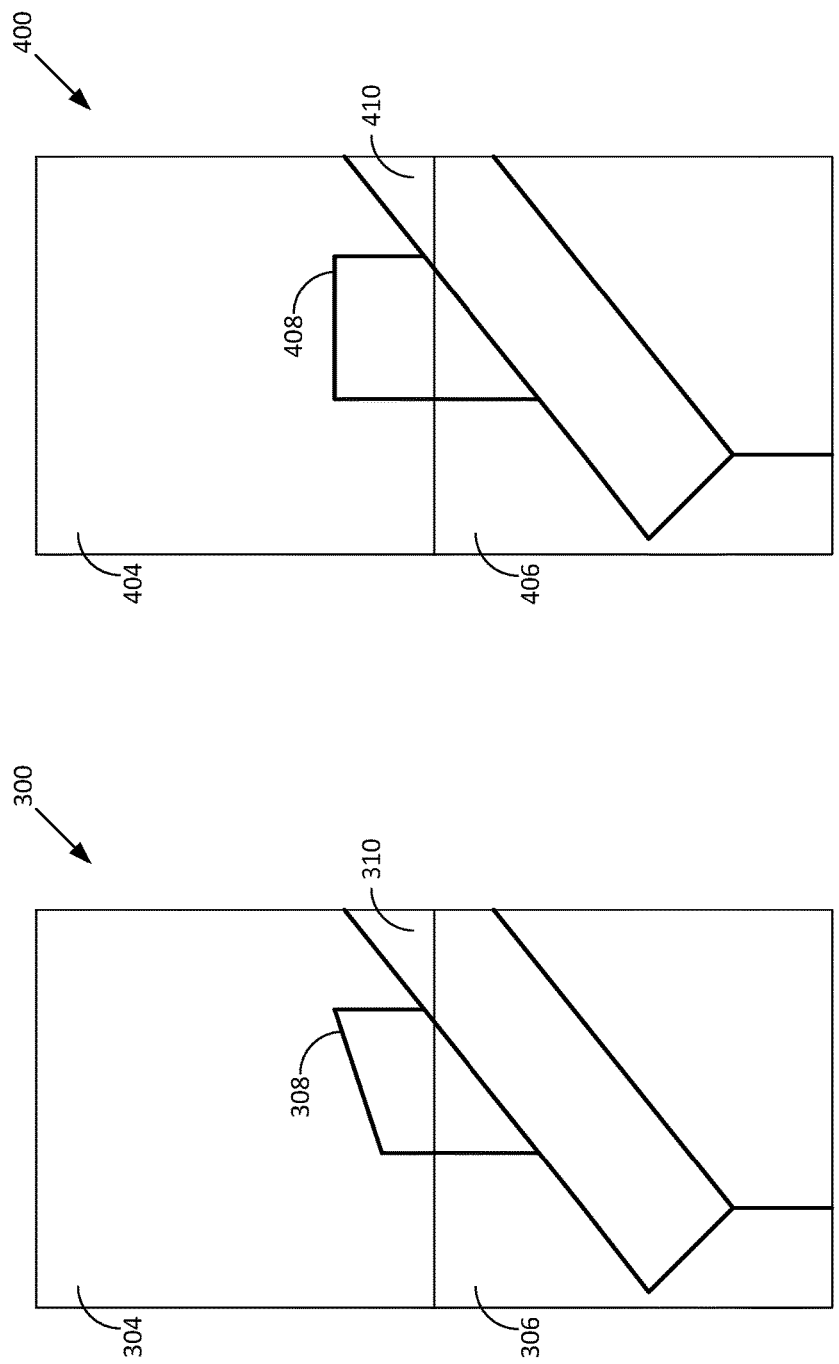

SYSTEM AND METHOD FOR ASSESSING A BUILDING STRUCTURE

CROSS REFERENCE TO RELATED APPLICATIONS

This application claims priority to and the benefit of the filing date of provisional U.S. Patent Application No. 62/244,968 entitled "System And Method For Assessing A Building Structure," filed on Oct. 22, 2015, the entire contents of which is hereby expressly incorporated herein by reference.

TECHNICAL FIELD

The present disclosure generally relates to a system and a method for assessing a building structure and, more particularly, providing for display one or more indicators indicative of the assessment.

BACKGROUND

The maintenance associated with a building can be a time intensive process. Usually the process begins with a visual inspection of the building in order to determine what may need fixing. An individual may be tasked to perform the visual inspection by visiting the building and inspecting the interior and exterior before deciding on repairs. Depending on various factors (e.g., size of the building, location, and weather conditions) the process may take a long time to complete. In some cases, there is no previous information that can be easily accessed to refer to when performing the visual inspection. In the event that a geographical area is affected by a natural disaster, the extensive repair work required may be greatly delayed due to the time spent assessing the damage to each of a relatively large number of buildings.

SUMMARY

Example systems and methods for assessing a building structure are herein described. In accordance with a first example aspect, a computer-implemented method for assessing a building structure is disclosed. The method is executed by one or more processors programmed to perform the method. The method includes receiving, by the one or more processors, information indicative of captured data, the captured data comprising an image of the building structure. The method also includes receiving, by the one or more processors, information indicative of an analysis of the captured data. The analysis of the captured data includes an analysis of one or more examined regions of the image. The one or more examined regions include a portion of the building structure. The method also includes, based on the analysis of the captured data, performing, by the one or more processors, an assessment of the one or more examined regions. Performing the assessment includes (i) determining one or more classifications each corresponding to a different one of the one or more examined regions, and (ii) determining one or more indicators each corresponding to a different one of the one or more classifications. The method also includes determining, by the one or more processors, a mapping of the one or more indicators to the one or more examined regions. The mapping corresponds to the image of the building structure. The method also includes providing for display, by the one or more processors, the one or more indicators overlaid onto the image according to the determined mapping.

In accordance with a second example aspect, a system for assessing a building structure is disclosed. The system includes a communication network, one or more processors communicatively coupled to the communication network, and a non-transitory computer-readable memory coupled to the one or more processors. The non-transitory computer-readable memory stores thereon instructions that, when executed by the one or more processors, cause the system to receive information indicative of captured data. The captured data comprises an image of the building structure. The instructions also cause the system to receive information indicative of an analysis of the captured data. The analysis of the captured data includes an analysis of one or more examined regions of the image, and the one or more examined regions include a portion of the building structure. The instructions also cause the system to perform, based on the analysis of the captured data, an assessment of the one or more examined regions, wherein performing the assessment includes (i) determining one or more classifications each corresponding to a different one of the one or more examined regions, and (ii) determining one or more indicators each corresponding to a different one of the one or more classifications. The instructions also cause the system to determine a mapping of the one or more indicators to the one or more examined regions. The mapping corresponds to the image of the building structure. The instructions also cause the system to provide for display the one or more indicators overlaid onto the image according to the determined mapping.

In accordance with a third example aspect, a tangible, computer-readable medium stores instructions that when executed by one or more processors of a computer system cause the computer system to receive, via a communication network, information indicative of captured data, the captured data comprising an image of the building structure. The instructions also cause the computer system to receive information indicative of an analysis of the captured data. The analysis of the captured data includes an analysis of one or more examined regions of the image, and the one or more examined regions include a portion of the building structure. The instructions also cause the computer system to, based on the analysis of the captured data, perform an assessment of the one or more examined regions, wherein performing the assessment includes (i) determining one or more classifications each corresponding to a different one of the one or more examined regions, and (ii) determining one or more indicators each corresponding to a different one of the one or more classifications. The instructions also cause the computer system to determine a mapping of the one or more indicators to the one or more examined regions. The mapping corresponds to the image of the building structure. The instructions also cause the computer system to provide for display the one or more indicators overlaid onto the image according to the determined mapping.

In further accordance with any one or more of the foregoing first, second, or third example aspects, a computer-implemented method, system, or computer-readable medium may further include any one or more of the following preferred forms.

In one form, the image is a current image, and determining the classification includes determining whether one or more thresholds are satisfied based on a comparison of the current image of the building structure and a previous image of the building structure.

In another form, the one or more indicators comprise one or more of a graphical image, text, and a digital effect.

In another form, the graphical image comprises a grid.

In another form, the one or more indicators vary in one or more of color and luminous intensity according to the analysis of the one or more examined regions.

In another form, the image is a current image, and the analysis of the captured data further comprises receiving information indicative of a previous image of the building structure, comparing one or more segments of the building structure associated with the current image to one or more segments of the building structure associated with the previous image, and based on the comparison, determining an evaluation of the one or more segments of the building structure associated with the current image.

In another form, information indicative of a user input associated with a given indicator of the one or more indicators is received, based on the given indicator and the analysis of the captured data, information indicative of the evaluation of the one or more segments of the building structure is obtained according to the information indicative of the user input, and an output signal comprising the information indicative of the evaluation of the one or more segments of the building structure is provided.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, where possible, the following description refers to the reference numerals included in the following figures, in which features depicted in multiple figures are designated with consistent reference numerals.

FIG. 3 depicts an example portion of an example grid overlaid onto an image of a building structure according to an embodiment of the present disclosure.

FIG. 4 depicts another example portion of another example grid overlaid onto an image of a building structure according to an embodiment of the present disclosure.

DETAILED DESCRIPTION

Figure 1:
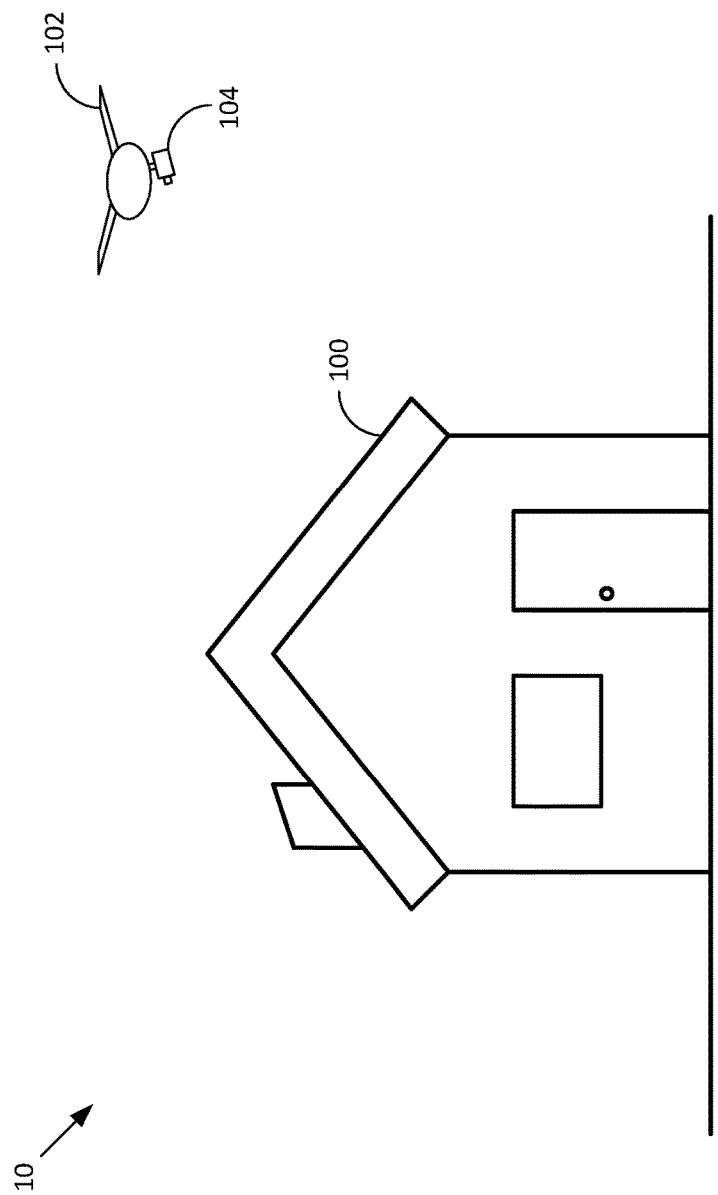
FIG. 1 is a diagram of an example environment in which a building structure may be assessed, according to an embodiment of the present disclosure.

In some embodiments of the present invention, the time and costs associated with a visual inspection of a building structure may be reduced by capturing image and/or video data of the building structure. In one example embodiment, the captured data may be captured by an individual with a handheld camera. In another example embodiment, the captured data may be captured by an unmanned aerial vehicle that is retrofitted with an imaging device capable of capturing an image, recording a video (i.e., a time sequence of images), or both. In either example, the captured data may be transmitted to a remote server for further analysis and processing.

In some embodiments, an analysis of the image(s) may be performed by the remote server. The analysis may include an analysis of one or more examined regions of the image(s). In one such embodiment, an image may be compared to a previous image in order to determine any changes to the building structure. The analysis may be performed by the remote server using image recognition software. The image recognition software may be configured to compare the images of the building structure in order to determine a change in state associated with one or more segments such as windows, doors, walls, etc. For example, a current image of the building structure may show a roof of a building structure that has been damaged. The damage to the roof may be detected and/or measured by comparing a previous image of the roof when no damage was present (e.g., upon completion of construction of the building structure) to the current image.

In one example scenario, a segment that comprises the siding of a building structure may have formed gaps and/or cracks that need to be repaired. The gaps and/or cracks may differ (e.g., color, intensity, and/or texture) from the undamaged areas of the siding. An analysis of an earlier image (e.g., an image captured when the building was relatively new) may calculate the percentage of pixels, out of all the pixels corresponding to the entire segment, that are "outliers" that differ from the average pixel value (with respect to color value, intensity value, etc.) by some threshold amount. A similar process may be done for a current image. Thereafter, the percentages of "outlier" pixels for the earlier and current images may be compared, and used to calculate a new percentage that reflects the difference in the two images. If the earlier image has 3% outlier pixels, for instance, and the current image has 12% outlier pixels, the new percentage may be 12/3×100%=400% difference. Alternatively, this may be calculated as the percentage change in the percentage of non-outlier pixels, e.g., (97−88)/97×100%=9.28%.

Based on the analysis, the remote server may perform an assessment of the one or more examined regions. The assessment may include determining classifications that correspond to the examined regions and also determining indicators that correspond to the classifications. In one example, the classifications may be based on a grading scheme for determining the state of a building segment. In this example, the indicators may be determined according to the classifications and provide a visual aspect with regard to the assessment.

In another example, the indicators may vary in color. For example, the color red may be chosen to represent a segment of the building structure that may need immediate repair (e.g., one week or less) while the color yellow may be chosen to represent a segment of the building structure that may need repair in the near, but not immediate, future (e.g., three to six months). By differentiating the indicators with different colors, an individual may be able to determine quickly what areas of the building structure need to be given priority over others.

The remote server may also be configured to determine a mapping of the indicators to the examined regions. The mapping may correspond to the image of the building structure. In one example, the remote server may include one or more software modules configured to analyze the image and determine one or more edges associated with various segments of the building structure in order to position the indicators in the corresponding locations.

Further, the remote server may provide for display of the indicators overlaid onto the image according to the determined mapping. In one example, the one or more indicators may comprise a graphical image, text, and a digital effect. By overlaying the one or more indicators onto the image, an individual may be able to determine quickly what may need to be repaired with the building structure.

The time associated with assessing a building structure may also be reduced by providing an individual with additional data (e.g., stored images, technical drawings, lists of materials, etc.) pertaining to the building structure. For example, the additional data may allow the individual to make decisions about what products or services may be needed in order to repair the building structure. In one scenario, the individual may review a record comprising a history of what prior work has been done to the building structure based on previous assessments.

Referring now to the figures, FIG. 1 is a diagram of an example environment 10 in which the structure of a building 100 may be assessed. In addition to the building 100, the environment 10 includes an unmanned aerial vehicle (UAV) 102 carrying an imaging device 104. The imaging device 104 may be communicatively coupled with the UAV 102. The UAV 102 or the imaging device 104 or both may be capable of transmitting a wireless signal to a remote server (not shown in FIG. 1).

The building 100 may be a residential home. In one example embodiment, a number of segments, such as a roof, windows, doors, and walls may need to be examined in order to determine a state associated with the segments. By way of example, a segment may be part of a door such as a window pane within the door. In another example, a segment may be the entire door itself or a set of two or more doors. In one scenario, one or more of the segments of the building 100 may need to be replaced at a given time. For instance, in the event of a natural disaster such as a hurricane, damage may occur to certain segments of the building 100, after which an assessment may need to be performed on the building 100.

In another example, the building 100 may be a commercial building. In this example, the commercial building may include segments similar to those of a residential home (e.g., a roof, windows, etc.), as well as segments that are different than the residential home (e.g., a revolving door). Similarly to the residential home, one or more segments of the commercial building may need to be replaced at a given time. In other embodiments, the building 100 may be industrial, agricultural, educational, or of any other nature.

The UAV 102 may be configured to be remotely controlled and configured with the capability to fly. In one instance, the UAV 102 may help to reach certain viewpoints of the building 100 that are not possible for an individual located on the ground. In one scenario, the UAV 102 may be configured to communicate with a remotely based server (not shown in FIG. 1). The remotely based server may be configured to receive and transmit data to the UAV 102. For instance, the UAV 102 may transmit GPS data, image data, and video data associated with the building 100 to the remotely based server for storage.

The use of a UAV, such as UAV 102, when capturing data of the building structure may be an effective tool for capturing data from remote locations. The captured data from the UAV may also serve to reduce the likelihood of errors that may occur from an individual visiting a site and maintaining a log associated with a visual inspection.

The imaging device 104 may include any number of photosensors, photodiodes, photomultipliers, or image sensor types, including charge-coupled-devices (CCD), complementary metal-oxide semiconductor (CMOS) sensors, or some combination therefore. In some instances, the imaging device may be a single-camera setup that is capable of capturing video, photo, infrared, etc. As used herein, the term "image" or "imaging" refers not only to camera images, but also to images obtained by other types of sensors. Thus, for example, the imaging device 104 may include a different type of sensor, such as a radar or LiDAR sensor.

The imaging device 104 may be used to capture one or more exterior sides of the building 100. After the one or more sides of the building 100 have been captured, the captured data may be transmitted to a remote based server for further processing. In one example embodiment, one or more components associated with the imaging device 104 may transmit a live view of the building 100 to an individual. In this example, the live view could be used to control the flight of the UAV 102 from a remote location. Remotely controlling the UAV 102 would allow an individual to situate the UAV 102 at a predetermined position (e.g., facing south when capturing an image of the roof) in order to obtain an image that corresponds with a previous image. In another example embodiment, the UAV 102 may be provided with instructions that the UAV 102 automatically carries out, without manual control, in order to assist with the analysis between one or more stored images. For example, the UAV 102 may be instructed to capture a front view of the building 100 at a height of about 10 feet.

Figure 2:
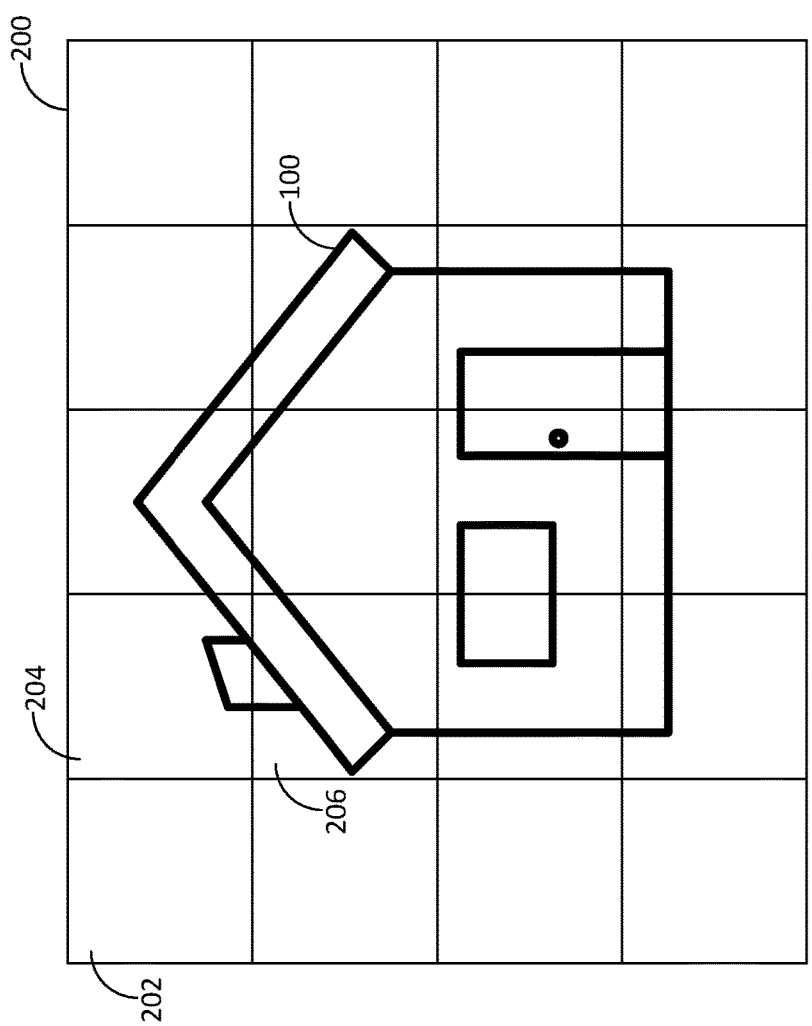
FIG. 2 depicts an example grid overlaid onto an image of a building structure according to an embodiment of the present disclosure.

FIG. 2 illustrates an example image 200 of building 100 of FIG. 1. The image 200 comprises multiple regions, including regions 202, 204 and 206. As shown in FIG. 2, other regions of the image 200 are not labeled. By way of example, regions that do not contain a portion of the building 100, such as region 202, may not be examined when assessing a building structure. However, regions 204 and 206 may be examined to determine whether building 100 needs any repairs.

In one example, an analysis of the image 200 may be received by one or more processors (e.g., of a server remote from the UAV 102 of FIG. 1), and the analysis may pertain to one or more examined regions of the image 200, such as region 204 and region 206. Moreover, each of the one or more examined regions may be associated with a score that was generated by the analysis. The score may be based on an amount of similarity between the one or more examined regions of the current image of the building 100 and one or more corresponding regions of a previous image of the building 100. In different implementations, a different score may be associated with each examined region, or a single score may be associated with multiple examined regions.

By way of example, the analysis may be performed by software that is designed to analyze and compare one or more images of the building 100. The software may be stored in a persistent memory of a server, for example, and executed by one or more processors of the server. In addition to the image(s), the software may receive additional data, such as weather related information, to assist in determining structural issues with one or more segments of the building 100. If a given building has been exposed to a season that produced an above average amount of rain and/or ice, for example, then a segment such as a gutter may be more susceptible to damage. In this scenario, the additional information could be used to examine one or more areas of the image that might otherwise not have been examined (e.g., areas that show the gutter).

The software may also include one or more modules that are configured to receive data pertaining to a list of building materials associated with the building. For instance, the list of building materials may include the types of various building segments, such as doors, windows, seals, siding, etc. As a more specific example, one or more modules of the software may take manufacturer information into consideration when determining if a replacement is needed for a particular segment. In one scenario, for example, the window seals located around a window may be functioning, but need replacement according to a next scheduled assessment of the building falling outside the manufacturer's recommendation of usage. The software module(s) may be configured to assign a certain score that is indicative of the need for replacement of a particular segment in the near future, along with recommendations of materials needed according to the list of building materials.

In one scenario, the analysis may be performed on all exterior sides of building 100, including the top side. This may be achieved by capturing the exterior sides through the use of UAV 102 from FIG. 1. By way of example, all of the captured data of the exterior sides may be transferred to a cloud based storage for further review and analysis. In one instance, the analysis may be performed on each side of the building 100 in order to provide an overall assessment of the building structure. In this instance, an individual could choose to view a given side of the building 100 in order to determine what part of the building 100 needs to be given priority.

FIG. 3 illustrates an example current image 300 of the building 100 of FIG. 1, and FIG. 4 illustrates an example previous image 400 of building 100 of FIG. 1. Each of the images 300 and 400 may be an entire image, or a portion of a larger image. Referring first to FIG. 3, image 300 is divided into region 304 and region 306. Region 304 includes a portion of a chimney 308 and a portion of a roof 310. Referring to FIG. 4, image 400 is divided into region 404 and region 406. Region 404 includes a portion of a chimney 408 and a portion of a roof 410. In this example, region 304 of FIG. 3 corresponds to region 404 of FIG. 4. Likewise, region 306 of FIG. 3 corresponds to region 406 of FIG. 4. In other words, the chimney 408 may be the chimney 308 as the chimney 308 existed at an earlier time, and the roof 410 may be the roof 310 as the roof 310 existed at that earlier time.

In one implementation, one or more software modules may be configured to analyze corresponding regions of the image 300 and the image 400 to detect differences in various segments of a building structure. As one example, the one or more software modules may be configured to detect a difference in angle associated with a corner of the chimney 308 compared to a corner of the chimney 408. Based on the difference(s) between the examined regions 304 and 404, the one or more software modules may provide a grade or other score associated with the analysis that is indicative of a need for repair to the building structure. In one scenario, the difference in angle associated with the corner of the chimney 308 compared to the corner of the chimney 408 may be 30 degrees. In this scenario, a score (e.g., five out of ten) may be assigned to region 304 in order to highlight the need for a repair to chimney 308.

In another example, the one or more software modules may be configured to detect damage to seals of a window pane. The one more software modules may be configured to apply an image processing technique (e.g., thresholding) to the examined region in order to detect damage (e.g., change in continuity and/or texture) to the seals. The examined region of the current image may be compared to a corresponding region of a previous image to determine a difference in pixels. For instance, a thirty percent difference in pixels between the examined region and the corresponding region may cause a grade of 'B' to be associated with the examined region. In this instance, the seals may not need immediate replacement but the grade will serve to inform an individual that a replacement may be needed within six to nine months.

In yet another example, the one or more software modules may be configured to detect damage associated with the roof of the building structure. For instance, an examined region that includes shingles may be analyzed to determine a number of shingles that are missing. In this instance, if more than five shingles are determined to be missing, then a grade of 'Poor' may be assigned to the examined region and signify a need for immediate repair.

Figure 5:
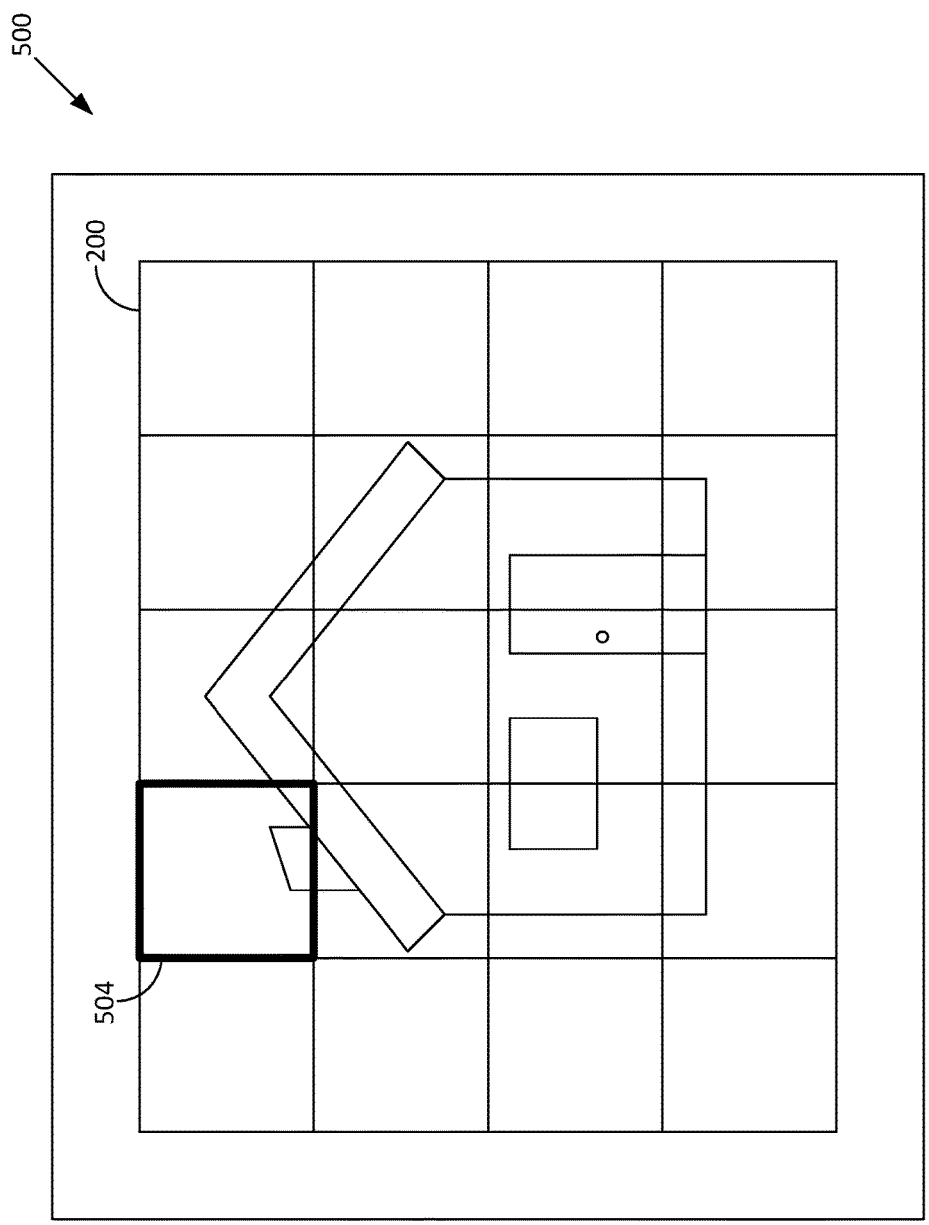
FIG. 5 depicts an example display for assessing a building structure according to an embodiment of the present disclosure.

FIG. 5 illustrates an example display 500 for assessing the building 100 of FIG. 1. Referring to FIG. 5, an example indicator 504 is shown overlaid onto an examined region of the image 200 of FIG. 2. In one implementation, one or more software modules may determine the indicator 504 based on the determined classifications of the examined regions 304 and 404 of FIGS. 3 and 4, respectively (e.g., based on the score or other result of the comparison of the regions 304 and 404). Further, the one or more software modules may determine a mapping of the indicator 504 in order to provide for display of the indicator 504 on the image 200 as shown in FIG. 5 (i.e., such that the indicator 504 is overlaid onto the portion of the image 200 that corresponds to the regions 304 and 404).

As shown, the indicator 504 may be in the form of a highlight around the corresponding examined region. For example, the highlight of the indicator 504 may be red if the analysis determined that a repair needs to be done promptly, or yellow if the analysis determined that a repair will be needed in the near future but does not need immediate attention. For instance, if the analysis determined that the roof is in fair condition but may need to be replaced within the near future (e.g., if a moderate score is assigned to the portion of the roof shown in the corresponding examined region), then the indicator 504 may be yellow. Various colors may be used to distinguish the results of the analysis of the building structure.

Figure 6:
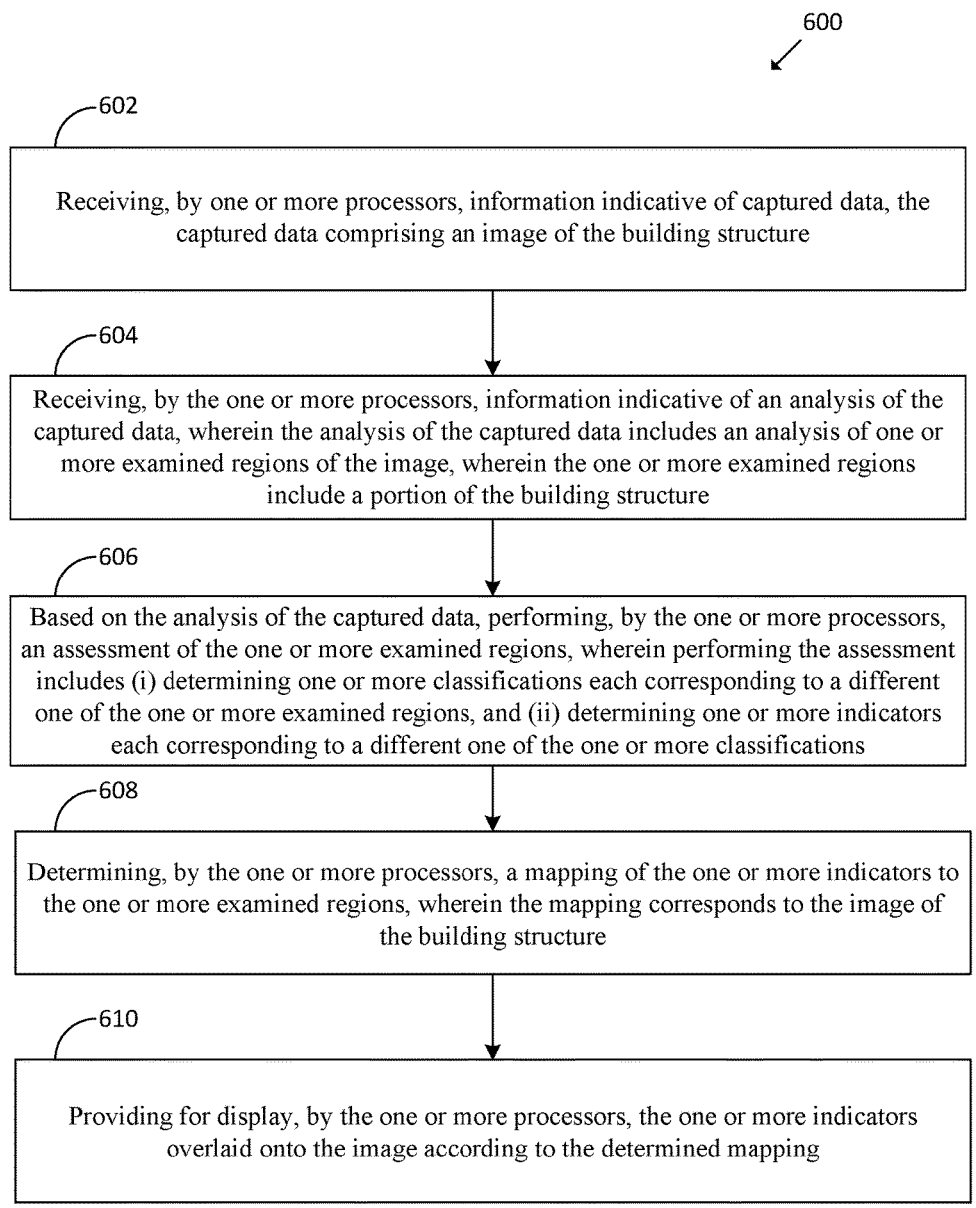
FIG. 6 depicts an example method for assessing a building structure according to an embodiment of the present disclosure.

FIG. 6 is a flow diagram of an example method 600 for assessing a building structure in accordance with at least some embodiments described herein. The method 600 may include one or more operations, functions, or actions as illustrated by blocks 602-610. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 600, the flowchart shows the functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 6 may represent circuitry that is wired to perform the specific logical functions in the process. Illustrative methods, such as method 600, may be carried out in whole or in part by a component or components in the cloud and/or system. However, it should be understood that example methods, such as method 600, may be carried out by other entities or combinations of entities (i.e., by other computing devices and/or combinations of computing devices), without departing from the scope of the invention.

For example, functions of the method 600 may be fully performed by a computing device (or components of a computing device such as one or more processors), or may be distributed across multiple components of the computing device, across multiple computing devices, and/or across a server.

As shown by block 602, the method 600 includes receiving, by the one or more processors, information indicative of captured data, the captured data comprising an image of the building structure. In one example, the captured data may include one or more images pertaining to the exterior sides of the building structure. In one scenario, the captured data may be stored in a remote server and used as reference data corresponding to the building structure. For instance, the reference data may be divided into a matrix library that contains image data, location, time, date, repairs performed, etc. By way of example, the captured data may serve as a reference map of the building structure.

In one example, the captured data may be obtained through the use of a UAV (e.g., UAV 102 of FIG. 1). Other examples are possible as well, such as a radio controlled device or a device that rolls, drives, crawls, climbs, etc. As another example, an individual may use a portable imaging device (i.e., a handheld camera) to capture images of the building structure. In one implementation, the image may be saved in an uncompressed format such as a raw image file in order to reduce the number of artifacts associated with other compressed file formats.

As shown by block 604, the method 600 also includes receiving, by the one or more processors, information indicative of an analysis of the captured data. The analysis of the captured data includes an analysis of one or more examined regions of the image, wherein the one or more examined regions include a portion of the building structure. The analysis may be based on user defined variables that are specific to a given geographic region. For instance, a particular geographic region may be more likely to be affected by hurricanes, and therefore one aspect of the analysis may be tailored to determine whether shingles of a roof are missing, blistered, etc. The analysis may place a higher priority on particular areas of a building (e.g., window panes) according to a historical analysis of nearby buildings.

In one implementation, the image is a current image of the building structure. It is understood that "current" is used herein as a relative term, and does not necessarily mean that the image is real-time or even very recent. In this implementation, the analysis may include receiving information indicative of a previous image of the building structure (i.e., an image earlier than the "current" image). The analysis may also include comparing one or more segments of the building structure associated with the current image to one or more corresponding segments of the building structure associated with the previous image. As used herein, two segments are "corresponding segments" if they are the same segment at two different points in time (e.g., the time at which the current image was captured and the time at which the previous image was captured). Based on the comparison, the analysis may determine an evaluation of the one or more segments of the building structure associated with the current image.

By way of example, the previous image may be selected from one or more stored images of the building structure. In one scenario, the analysis may correspond to a given period of time. For instance, the analysis may determine the amount of change over a given period of time by comparing the current image to the one or more stored images.

In another example, the corresponding segments that are compared to each other may be any component of the building structure, such as one or more window panes. In one instance, a window pane may be examined in order to identify defects associated with temperature control and/or vapor barrier. Based on the analysis, one or more records associated with the window pane may be retrieved in order to provide information about cost and availability of materials needed for replacement.

The evaluation may be based on a percentage of difference between the current image and the previous image. For example, based on a difference of more than fifty percent between an examined region of the current image and a corresponding examined region of the previous image, the evaluation may indicate immediate repair is needed. In one example, an image analysis technique such as edge detection may be used on the examined region in the two images. For instance, the edges extracted from the examined region may differ (e.g., changes in angle, length, continuity, etc.) by more than fifty percent from the edges extracted from the corresponding examined region, which may reflect structural damage to the building structure.

As shown by block 606, the method 600 also includes performing, based on the analysis of the captured data and by the one or more processors, an assessment of the one or more examined regions, wherein performing the assessment includes (i) determining one or more classifications each corresponding to a different one of the one or more examined regions, and (ii) determining one or more indicators each corresponding to a different one of the one or more classifications. In one example, each classification may be determined according to a grading scheme that takes into consideration the amount of time before a building segment typically needs to be replaced, or a recommended replacement interval. For instance, if an examined region includes a portion of a window pane, and the portion of the window pane is in a normal state, then a grade of "A" may be assigned to the region. The grade of "A" may be associated with a segment that does not require replacement for at least 12 months or more. In another instance, if a given examined region includes a portion of a window pane that is broken, then a grade of "C" may be assigned to the given examined region in order to bring attention to the individual. The grade of "C" may be associated with something that is recommended to be replaced within a short period of time.

In one implementation and scenario, the image referred to above is a current image, and determining the classification includes determining whether one or more thresholds are satisfied based on a comparison of the current image of the building structure and a previous image of the building structure. In this scenario, the one or more thresholds may be defined according to a given segment of the building structure. For instance, based on the expected duration of a roof of the building structure, the roof may be associated with a higher threshold than a sealant located around a window pane. The one or more thresholds may allow for segments of the building structure to be classified accordingly to their respective expected durations.

As shown by block 608, the method 600 also includes determining, by the one or more processors, a mapping of the one or more indicators to the one or more examined regions. The mapping corresponds to the image of the building structure, and may be used to provide a visual map of the examined regions. For example, a given examined region of the building structure may be associated with a given indicator. In this example, the mapping would determine the position of the given indicator (e.g., indicator 504 of FIG. 5) so that it is displayed with the given examined region (e.g., region 304 of FIG. 3) and not another examined region (e.g., region 306 of FIG. 3). The mapping may also be based on building information of the building structure. For instance, if technical drawings of a building have been made available, the information pertaining to positions of the one or more building segments may also be used to assist with the mapping. This may be used when additional granularity is required to highlight a particular building segment such as a window pane.

As shown by block 610, the method 600 also includes providing for display, by the one or more processors, the one or more indicators overlaid onto the image according to the determined mapping. In one scenario, an individual may view the one or more indicators overlaid onto the image on a display device, such as a laptop computer or any other suitable electronic device. In this scenario, the individual may scroll through the one or more images of the building structure to view an overall assessment of the building structure. Additional information associated with the one or more indicators may also be provided for display. For example, if a portion of the roof has an indicator that serves to indicate that the portion of the roof needs to be replaced, then additional information such as one or more recommendations for replacement materials may be provided for display as well.

In one scenario, the one or more indicators may include a graphical image, text, and/or a digital effect. By way of example, the graphical image may include an outline of one or more building segments for which replacement is recommended (e.g., an outline corresponding to the shape of a window pane). In another example, the graphical image may comprise a grid. The one or more areas defined by the grid may be highlighted with different colors to indicate that one or more examined regions should be given priority with regard to replacements. For instance, a first area may be displayed with the color yellow, and with less luminous intensity than a second area that is displayed with the color red. The first area may be given less priority than the second area based on the scores produced by the analysis, for example, and possibly based on expected durations of the building segments associated with each area, for example. The one or more indicators may vary in color and/or luminous intensity according to the analysis.

While not shown in FIG. 6, the method 600 may also include receiving information indicative of a user input associated with a given indicator of the one or more indicators. For example, the given indicator may include a digital effect (e.g., a pop-up window) that provides additional information when a user causes a cursor to hover over the given indicator. Based on the given indicator and the analysis, the method 600 may also include obtaining information indicative of the evaluation of the one or more segments of the building structure according to the information indicative of the user input. In one example, an individual may click on a given indicator (e.g., a red highlighting of a particular segment) in order to view the underlying analysis. In this example, a window may then pop up over the image and display a percent change in angle associated with the segment (e.g., chimney 308 of FIG. 3), and possibly also a list of recommended products and/or services for repairing the segment.

The obtained information may be stored in a remote cloud based server, or elsewhere. Further, the method 600 may also include providing an output signal (e.g., a report, etc.) comprising the information indicative of the evaluation of the one or more segments of the building structure. The evaluation of the one or more segments may include additional information pertaining to the one or more segments as described above with respect to recommendations for replacement materials. In another example, a user interface may be configured to determine the display of the indicators based on input from an individual. For instance, the individual may choose to display only the indicators that are associated with a classification indicating immediate replacement.

Figure 7:
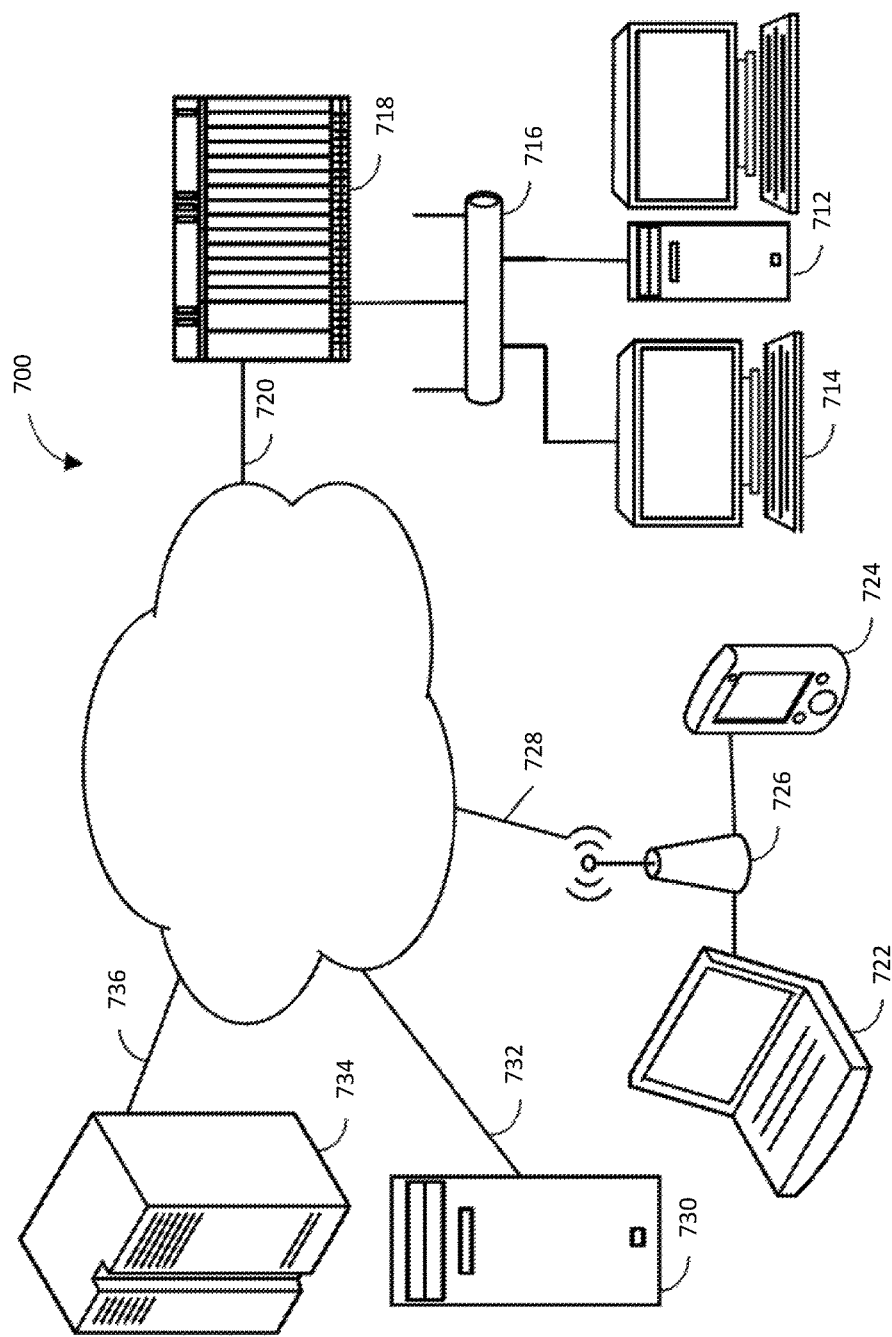
FIG. 7 is a block diagram of a network and computer hardware that may be utilized in accordance with the described embodiments.

FIG. 7 illustrates an exemplary block diagram of a network 700 and computer hardware that may be utilized in accordance with the described embodiments. The network 700 may be the Internet, a virtual private network (VPN), or any other network or combination of networks that allows one or more computers, communication devices, databases, etc., to be communicatively connected to each other. The network 700 may be connected to a personal computer 712 and a computer terminal 714 via an Ethernet 716 and a router 718, and via a landline 720. The Ethernet 716 may be a subnet of a larger Internet Protocol network. Other networked resources, such as projectors or printers (not depicted), may also be supported via the Ethernet 716 or another data network. Additionally, the network 700 may be wirelessly connected to a laptop computer 722 and a personal data assistant 724 via a wireless communication station 726 and a wireless link 728. Similarly, a server 730 may be connected to the network 700 using a communication link 732 and a mainframe 734 may be connected to the network 700 using another communication link 736. The network 700 may be useful for supporting peer-to-peer network traffic.

In one implementation, an image of the building structure may be received via the communication link 732 at the server 730. The server 730 may also be configured to receive an analysis of the image and perform an assessment of the one or more examined regions of the image. Further, the server 730 may be configured to determine a mapping of the one or more indicators to the one or more examined regions. In this embodiment, the server 730 may also provide a signal via the network 700 for displaying the one or more indicators overlaid onto the image. The signal may be received via wireless link 728 and displayed at the laptop 722 or the personal data assistant 724. In other implementations, the operations may be done by different devices in FIG. 7, and/or FIG. 7 may include more, fewer or different devices than are shown.

Figure 8:
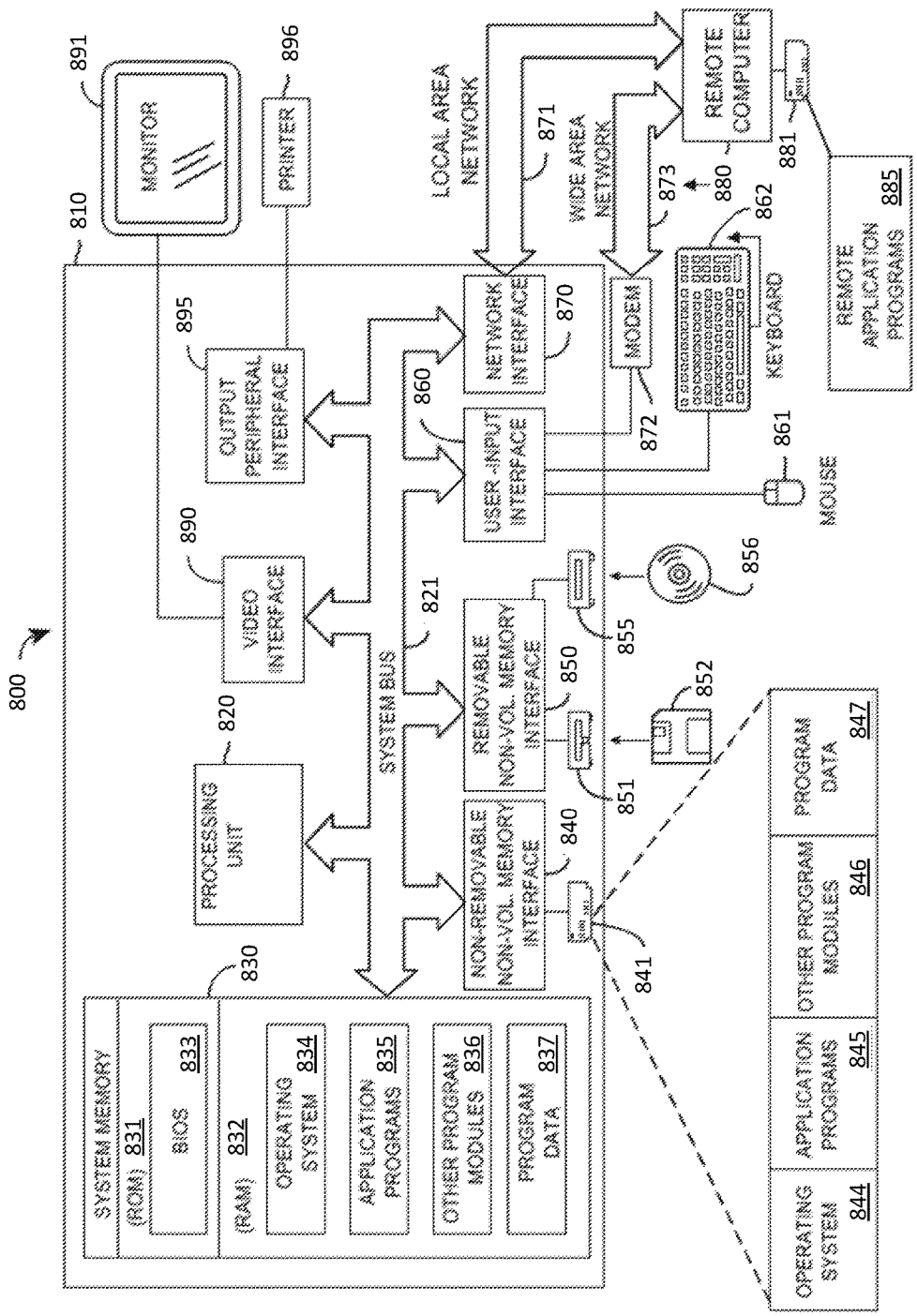
FIG. 8 is a block diagram of an example computer system in which the described embodiments may be implemented.

FIG. 8 is a block diagram of an example system 800 that may operate in accordance with the described embodiments. The system 800 of FIG. 8 includes a computing device in the form of a computer 810. Components of the computer 810 may include, and are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 810 typically includes a variety of computer readable media. Computer readable media can be any available media that can be accessed by computer 810 and includes both volatile and nonvolatile media, and both removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules or routines, e.g., analyzing, calculating, indicating, etc., that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and cursor control device 861, commonly referred to as a mouse, trackball or touch pad. A screen 891 or other type of display device is also connected to the system bus 821 via an interface, such as a graphics controller 890. In addition to the screen 891, computers may also include other peripheral output devices such as printer 896, which may be connected through an output peripheral interface 895.

The computer 810 may operate in a networked environment using logical connections to one or more remote computers, such as a remote computer 880. The remote computer 880 may transmit and receive data from the UAV 102 of FIG. 1. The logical connections depicted in FIG. 8 include a local area network (LAN) 871 and a wide area network (WAN) 873, but may also include other networks. Such networking environments are commonplace in offices, enterprise-wide computer networks, intranets, and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the input interface 860, or other appropriate mechanism. In a networked environment, program modules depicted relative to the computer 810, or portions thereof, may be stored in the remote memory storage device 881. By way of example, and not limitation, FIG. 8 illustrates remote application programs 885 as residing on memory device 881.

The communications connections 870, 872 allow the device to communicate with other devices. The communications connections 870, 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

The embodiments for the methods for assessing a building structure as described above may be implemented in part or in their entirety using one or more computer systems such as the computer system 800 illustrated in FIG. 8. The information indicative of an analysis of the captured data, the one or more indicators, and the mapping of the one or more indicators may be received by a computer such as the computer 810, for example. The information indicative of the analysis of the captured data, the one or more indicators, and the mapping of the one or more indicators may be received over a communication medium such as local area network 871 or wide area network 873, via network interface 870 or user-input interface 860, for example. As another example, the information indicative of an analysis of the captured data, the one or more indicators, and the mapping of the one or more indicators may be received from a remote source such as the remote computer 880 where the data is initially stored on memory device such as the memory storage device 881. As another example, the information indicative of an analysis of the captured data, the one or more indicators, and the mapping of the one or more indicators may be received from a removable memory source such as the nonvolatile magnetic disk 852 or the nonvolatile optical disk 856. As another example, the information indicative of an analysis of the captured data, the one or more indicators, and the mapping of the one or more indicators may be received as a result of a human entering data through an input device such as the keyboard 862. In some implementations, the computer 810 itself performs the analysis.

Some or all of the analyzing or calculating involved in analyzing the captured data, determining the one or more indicators, and/or determining the mapping of the one or more indicators may be performed by a computer such as the computer 810, and more specifically may be performed by one or more processors, such as the processing unit 820, for example. In some embodiments, some calculations may be performed by a first computer such as the computer 810 while other calculations may be performed by one or more other computers such as the remote computer 880. The analyses and/or calculations may be performed according to instructions that are part of a program such as the application programs 835, the application programs 845 and/or the remote application programs 885, for example. For example, the method 600 may be performed by the processing unit 820 when executing instructions stored in RAM 832.

In some embodiments, analyzing the captured data, determining the one or more indicators, and determining the mapping of the one or more indicators may include sending data over a network such as the local area network 871 or the wide area network 873 to another computer, such as the remote computer 881. In other embodiments, providing for display a mapping of the one or more indicators to the one or more examined regions may include sending data over a video interface such as the video interface 890 to display information for assessing the building structure on an output device such as the screen 891, for example.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a communication system and method for a mobile platform. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A computer-implemented method for assessing a building structure, the method executed by one or more processors programmed to perform the method, the method comprising: receiving, by the one or more processors, information indicative of captured data, the captured data comprising an image of the building structure; receiving, by the one or more processors, information indicative of an analysis of the captured data, wherein the analysis of the captured data includes an analysis of one or more examined regions of the image, and wherein the one or more examined regions include a portion of the building structure; based on the analysis of the captured data, performing, by the one or more processors, an assessment of the one or more examined regions, wherein performing the assessment includes (i) determining one or more classifications each corresponding to a different one of the one or more examined regions, and (ii) determining one or more indicators each corresponding to a different one of the one or more classifications; determining, by the one or more processors, a mapping of the one or more indicators to the one or more examined regions, wherein the mapping corresponds to the image of the building structure; and providing for display, by the one or more processors, the one or more indicators overlaid onto the image according to the determined mapping.

Aspect 2: The computer-implemented method of claim 1, wherein the image is a current image, and wherein determining the classification includes determining whether one or more thresholds are satisfied based on a comparison of the current image of the building structure and a previous image of the building structure.

Aspect 3: The computer-implemented method of aspects 1-2, wherein the one or more indicators comprise one or more of a graphical image, text, and a digital effect.

Aspect 4: The computer-implemented method of aspects 1-3, wherein the graphical image comprises a grid.

Aspect 5: The computer-implemented method of aspects 1-4, wherein the one or more indicators vary in one or more of color and luminous intensity according to the analysis of the one or more examined regions.

Aspect 6: The computer-implemented method of aspects 1-5, wherein the image is a current image, wherein the analysis of the captured data further comprises: receiving information indicative of a previous image of the building structure; comparing one or more segments of the building structure associated with the current image to one or more segments of the building structure associated with the previous image; and based on the comparison, determining an evaluation of the one or more segments of the building structure associated with the current image.

Aspect 7: The computer-implemented method of aspects 1-6, further comprising: receiving information indicative of a user input associated with a given indicator of the one or more indicators; based on the given indicator and the analysis of the captured data, obtaining information indicative of the evaluation of the one or more segments of the building structure according to the information indicative of the user input; and providing an output signal comprising the information indicative of the evaluation of the one or more segments of the building structure.

Aspect 8: A system for assessing a building structure, the system comprising: a communication network; one or more processors communicatively coupled to the communication network; and a non-transitory computer-readable memory coupled to the one or more processors and storing thereon instructions that, when executed by the one or more processors, cause the system to: receive information indicative of captured data, the captured data comprising an image of the building structure; receive information indicative of an analysis of the captured data, wherein the analysis of the captured data includes an analysis of one or more examined regions of the image, wherein the one or more examined regions include a portion of the building structure; based on the analysis of the captured data, perform an assessment of the one or more examined regions, wherein performing the assessment includes (i) determining one or more classifications each corresponding to a different one of the one or more examined regions, and (ii) determining one or more indicators each corresponding to a different one of the one or more classifications; determine a mapping of the one or more indicators to the one or more examined regions, wherein the mapping corresponds to the image of the building structure; and provide for display the one or more indicators overlaid onto the image according to the determined mapping.

Aspect 9: The system of aspect 8, wherein the image is a current image, and wherein determining the classification includes determining whether one or more thresholds are satisfied satisfying based on a comparison of the current image of the building structure to a previous image of the building structure.

Aspect 10: The system of aspects 8-9, wherein the one or more indicators comprise one or more of a graphical image, text, and a digital effect.

Aspect 11: The system of aspects 8-10, wherein the graphical image comprises a grid.

Aspect 12: The system of aspects 8-11, wherein the one or more indicators vary in one or more of color and luminous intensity according to the analysis of the one or more examined regions.

Aspect 13: The system of aspects 8-12, wherein the image is a current image, wherein the analysis of the captured data further comprises: receiving information indicative of a previous image of the building structure; comparing one or more segments of the building structure associated with the current image to one or more segments of the building structure associated with the previous image; and based on the comparison, determining an evaluation of the one or more segments of the building structure associated with the current image.

Aspect 14: The system of aspects 8-13, wherein the instructions further comprise: receive information indicative of a user input associated with a given indicator of the one or more indicators; based on the given indicator and the analysis of the captured data, obtain information indicative of the evaluation of the one or more segments of the building structure according to the information indicative of the user input; and provide an output signal comprising the information indicative of the evaluation of the one or more segments of the building structure.

Aspect 15: A tangible, computer-readable medium storing instructions that when executed by one or more processors of a computer system, cause the computer system to receive, via a communication network, information indicative of captured data, the captured data comprising an image of the building structure; receive information indicative of an analysis of the captured data, wherein the analysis of the captured data includes an analysis of one or more examined regions of the image, wherein the one or more examined regions include a portion of the building structure; based on the analysis of the captured data, perform an assessment of the one or more examined regions, wherein performing the assessment includes (i) determining one or more classifications each corresponding to a different one of the one or more examined regions, and (ii) determining one or more indicators each corresponding to a different one of the one or more classifications; determine a mapping of the one or more indicators to the one or more examined regions, wherein the mapping corresponds to the image of the building structure; and provide for display the one or more indicators overlaid onto the image according to the determined mapping.

Aspect 16: The computer-readable medium of aspect 15, wherein the one or more indicators comprise one or more of a graphical image, text, and a digital effect.

Aspect 17: The computer-readable medium of aspects 15-16, wherein the graphical image comprises a grid.

Aspect 18: The computer-readable medium of aspects 15-17, wherein the one or more indicators vary in one or more of color and luminous intensity according to the analysis of the one or more examined regions.

Aspect 19: The computer-readable medium of aspects 15-18, wherein the image is a current image, and wherein the analysis of the captured data further comprises: receiving information indicative of a previous image of the building structure; comparing one or more segments of the building structure associated with the current image to one or more segments of the building structure associated with the previous image; and based on the comparison, determining an evaluation of the one or more segments of the building structure associated with the current image.

Aspect 20: The computer-readable medium of aspects 15-19, wherein the instructions further comprise: receive information indicative of a user input associated with a given indicator of the one or more indicators; based on the given indicator and the analysis of the captured data, obtain information indicative of the evaluation of the one or more segments of the building structure according to the information indicative of the user input; and provide an output signal comprising the information indicative of the evaluation of the one or more segments of the building structure.

What is claimed:

1. A computer-implemented method for assessing a building structure, the method executed by one or more processors programmed to perform the method, the method comprising:
   receiving, by the one or more processors, information indicative of captured data, the captured data comprising a first image and a second image of the building structure, the second image captured at an earlier point in time than the first image, and the first image and the second image comprising respective sets of pixels;
   analyzing, by the one or more processors, each examined region of a plurality of examined regions of the first image included in the captured data, the each examined region depicting a respective portion of the building structure, and analyzing the each examined region of the first image including determining, for the each examined region of the first image, a respective percentage difference of outlier pixels between the each examined region of the first image and a corresponding region of the second image, the corresponding region of the second image depicting the respective portion of the building structure of the first image at the earlier point in time;
   assessing, by the one or more processors, the each examined region of the first image, including:
      (i) determining, based on the analysis of the captured data, a respective classification of the each examined region of the first image based on the respective percentage difference of outlier pixels, the respective classification being a respective grade or score indicative of a respective immediacy of need of repair of the respective portion of the building structure; and
      (ii) determining a respective indicator corresponding to the respective classification of the each examined region;
   determining, by the one or more processors, a mapping of the respective indicator corresponding to the each examined region of the first image to the respective portion of the building structure; and
   providing for display, by the one or more processors, the respective indicators of the plurality of examined regions overlaid onto the respective portions of the building structure depicted in the first image according to the determined mappings, thereby indicating relative priorities, across the plurality of examined regions, of respective replacements of respective one or more building segments depicted in the each examined region.

2. The computer-implemented method of claim 1, further comprising:
   determining a respective percentage of outlier pixels of the each examined region of the first image based on a difference between a respective average pixel value of the each examined region of the first image and a threshold amount; and
   determining a respective percentage of outlier pixels of the corresponding region of the second image based on a difference between a respective average pixel value of the corresponding region of the second image and the threshold amount, and
   wherein determining the respective percentage difference of outlier pixels between the each examined region of the first image and the corresponding region of the second image is based upon the respective percentage of outlier pixels of the each examined region of the first image and the respective percentage of outlier pixels of the corresponding region of the second image.

3. The computer-implemented method of claim 1, wherein the respective indicators of the plurality of examined regions comprise one or more of a graphical image, text, or a digital effect.

4. The computer-implemented method of claim 3, wherein the graphical image comprises a grid.

5. The computer-implemented method of claim 1, wherein the respective indicators of the plurality of examined regions vary in one or more of color or luminous intensity according to the respective classifications of the plurality of examined regions.

6. The computer-implemented method of claim 1, wherein the each examined region of the first image depicts a respective segment of the building structure, and wherein analyzing the each examined region of the first image further comprises, for the each examined region of the first image:
   comparing the respective segment of the building structure depicted in the each examined region of the first image to the respective segment of the building structure depicted in the corresponding region of the second image at the earlier point in time; and based on the comparison, determining an evaluation of the respective segment of the building structure.

7. The computer-implemented method of claim 6, further comprising:
receiving information indicative of a user input associated with a given respective indicator of the respective indicators of the plurality of examined regions;
based on the given respective indicator and the analysis of plurality of examined regions, obtaining information indicative of the evaluation of the respective segment of the building structure according to the information indicative of the user input; and
providing an output signal comprising the information indicative of the evaluation of the respective segment of the building structure.

8. A system for assessing a building structure, the system comprising:
a communication network;
one or more processors communicatively coupled to the communication network; and a non-transitory computer-readable memory coupled to the one or more processors and storing thereon instructions that, when executed by the one or more processors, cause the system to:
receive information indicative of captured data, the captured data comprising a first image and a second image of the building structure, the second image captured at an earlier point in time than the first image, and the first image and the second image comprising respective sets of pixels;
analyze each examined region of a plurality of examined regions of the first image included in the captured data, the each examined region depicting a respective portion of the building structure, and the analysis of the each examined region of the first image including a determination, for the each examined region of the first image, of a respective percentage difference of outlier pixels between the each examined region of the first image and a corresponding region of the second image, the corresponding region of the second image depicting the respective portion of the building structure of the first image at the earlier point in time;
assess the each examined region of the first image, the assessment of the each examined region including:
(i) a determination, based on the analysis of the captured data, of a respective classification of the each examined region of the first image based on the respective percentage difference of outlier pixels, the respective classification being a respective grade or score indicative of a respective immediacy of need of repair of the respective portion of the building structure; and
(ii) a determination of a respective indicator corresponding to the respective classification of the each examined region;
determine a mapping of the respective indicator corresponding to the each examined region of the first image to the respective portion of the building structure; and
provide for display the respective indicators of the plurality of examined regions overlaid onto the respective portions of the building structure depicted in the first image according to the determined mappings, thereby indicating relative priorities, across the plurality of examined regions, of respective replacements of respective one or more building segments depicted in the each examined region.

9. The system of claim 8,
wherein the instructions stored on the non-transitory computer-readable memory, when executed by the one or more processors, cause the system further to:
determine a respective percentage of outlier pixels of the each examined region of the first image based on a difference between a respective average pixel value of the each examined region of the first image and a threshold amount; and
determine a respective percentage of outlier pixels of the corresponding region of the second image based on a difference between a respective average pixel value of the corresponding region of the second image and the threshold amount, and
wherein the determination of the respective percentage difference of outlier pixels between the each examined region of the first image and the corresponding region of the second image is based upon the respective percentage of outlier pixels of the each examined region of the first image and the respective percentage of outlier pixels of the corresponding region of the second image.

10. The system of claim 8, wherein the respective indicators of the plurality of examined regions comprise one or more of a graphical image, text, or a digital effect.

11. The system of claim 10, wherein the graphical image comprises a grid.

12. The system of claim 8, wherein the respective indicators of the plurality of examined regions vary in one or more of color or luminous intensity according to the respective classifications of the plurality of examined regions.

13. The system of claim 8, wherein:
the each examined region of the first image depicts a respective segment of the building structure; and
the analysis of the each examined region of the first image further comprises, for the each examined region of the first image:
a comparison of the respective segment of the building structure depicted in the each examined region of the first image to the respective segment of the building structure depicted in the corresponding region of the second image; and
based on the comparison, determining an evaluation of the respective segment of the building structure.

14. The system of claim 13, wherein the instructions stored on the non-transitory computer-readable memory, when executed by the one or more processors, cause the system further to:
receive information indicative of a user input associated with a given respective indicator of the respective indicators of the plurality of examined regions;
based on the given respective indicator and the analysis of the plurality of examined regions, obtain information indicative of the evaluation of the respective segment of the building structure according to the information indicative of the user input; and
provide an output signal comprising the information indicative of the evaluation of the respective segment of the building structure.

15. A non-transitory, computer-readable medium storing instructions that when executed by one or more processors of a computer system, cause the computer system to:
receive, via a communication network, information indicative of captured data, the captured data comprising a first image and a second image of the building structure, the second image captured at an earlier point in time than the first image, and the first image and the second image comprising respective sets of pixels;

analyze each examined region of a plurality of examined regions of the first image included in the captured data, the each examined region depicting a respective portion of the building structure, and the analysis of the each examined region of the first image including a determination, for the each examined region of the first image, a respective percentage difference of outlier pixels between the each examined region of the first image and a corresponding region of the second image, the corresponding region of the second image depicting the respective portion of the building structure of the first image at the earlier point in time;

assess the each examined region of the first image, the assessment of the each examined region including:
 (i) a determination, based on the analysis of the captured data, a respective classification of the each examined region of the first image based on the respective percentage difference of outlier pixels, the respective classification being a respective grade or score indicative of a respective immediacy of need for repair of the respective portion of the building structure; and
 (ii) a determination of a respective indicator corresponding to the respective classification of the each examined region;

determine a mapping of the respective indicator corresponding to the each examined region of the first image to the respective portion of the building structure; and provide for display the respective indicators of the plurality of examined regions overlaid onto the respective portions of the building structure depicted in the first image according to the determined mappings, thereby indicating relative priorities, across the plurality of examined regions, of respective replacements of respective one or more building segments depicted in the each examined region.

16. The computer-readable medium of claim 15, wherein respective indicators of the plurality of examined regions comprise one or more of a graphical image, text, or a digital effect.

17. The computer-readable medium of claim 16, wherein the graphical image comprises a grid.

18. The computer-readable medium of claim 15, wherein the respective indicators of the plurality of examined regions vary in one or more of color or luminous intensity according to respective classifications of the plurality of examined regions.

19. The computer-readable medium of claim 15, wherein:
 the each examined region of the first image depicts a respective segment of the building structure; and
 the analysis of the each examined region of the first image further comprises, for the each examined region of the first image:
  a comparison of the respective segment of the building structure depicted in the each examined region of the first image to be respective segment of the building structure depicted in the corresponding region of the second image; and
  based on the comparison, determining an evaluation of the respective segment of the building structure.

20. The computer-readable medium of claim 19, wherein the instructions stored on the non-transitory computer-readable memory, when executed by the one or more processors, cause the system further to:
 receive information indicative of a user input associated with a given respective indicator of the respective indicators of the plurality of examined regions;
 based on the given respective indicator and the analysis of the plurality of examined regions, obtain information indicative of the evaluation of the respective segment of the building structure according to the information indicative of the user input; and
 provide an output signal comprising the information indicative of the evaluation of the respective segment of the building structure.

* * * * *